United States Patent
Sarkola

(10) Patent No.: US 6,587,498 B1
(45) Date of Patent: Jul. 1, 2003

(54) LEVELING OUT OF INTERFERENCE IN A MOBILE NETWORK USING A HOPPING METHOD

(75) Inventor: Eino Sarkola, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/604,501

(22) Filed: Jun. 27, 2000

Related U.S. Application Data

(63) Continuation of application No. PCT/FI98/01030, filed on Dec. 30, 1998.

(30) Foreign Application Priority Data

Dec. 30, 1997 (FI) .................................................. 974646

(51) Int. Cl.⁷ .............................................. H04B 1/713
(52) U.S. Cl. ....................................................... 375/132
(58) Field of Search ................................. 375/132, 131, 375/133, 219, 138, 220, 222; 370/294, 295, 319, 321, 330, 337, 344, 347, 442, 480, 331; 455/3.1, 62, 63, 561, 507, 408, 426, 430, 439, 450, 451

(56) References Cited

U.S. PATENT DOCUMENTS

| | | | |
|---|---|---|---|
| 5,394,433 A | 2/1995 | Bantz et al. | 375/132 |
| 5,425,049 A | 6/1995 | Dent | 375/132 |
| 5,541,954 A | 7/1996 | Emi | 375/133 |
| 5,581,548 A | 12/1996 | Ugland et al. | 370/330 |
| 5,657,343 A | 8/1997 | Schilling | 375/133 |
| 5,719,857 A * | 2/1998 | Heikkinen | 370/330 |
| 5,781,582 A * | 7/1998 | Sage et al. | 375/202 |
| 5,937,002 A * | 8/1999 | Andersson et al. | 375/202 |
| 6,011,786 A * | 1/2000 | Dent | 370/330 |
| 6,157,669 A * | 12/2000 | Kotzin | 370/347 |
| 6,212,384 B1 * | 4/2001 | Almgren et al. | 455/446 |
| 6,223,040 B1 * | 4/2001 | Dam | 370/337 |
| 6,240,125 B1 * | 5/2001 | Andersson et al. | 375/132 |

FOREIGN PATENT DOCUMENTS

| | | |
|---|---|---|
| WO | 96/02979 | 2/1996 |
| WO | 96/02980 | 2/1996 |

OTHER PUBLICATIONS

International Search Report for PCT/FI98/01030.
"Channel Assignment Schemes for Cellular Mobile Telecommunication Systems: A Comprehensive Survey" Katzela, et al. IEEE Personal Communicatoins, 6/96 pp. 10–31.

* cited by examiner

*Primary Examiner*—Chi Pham
*Assistant Examiner*—Emmanuel Bayard
(74) *Attorney, Agent, or Firm*—Squire, Sanders & Dempsey L.L.P.

(57) ABSTRACT

The idea of the invention is to achieve optimum levelling out of interference by controlling the usage distribution of hopping states. Usage is not necessarily uniformly distributed, but certain hopping states are used more frequently than others. The distribution of hopping states may, for example, be determined by minimizing a pre-determined penalty function. The performance of the distribution can be monitored, for example, on the basis of network geometry, predicted or measured field strength, and traffic data. Once the frequency usage distribution is determined, it is possible to specify the frequency-hopping pattern to be used for the connection. The higher the probability that a frequency is used for a given connection, as determined by the optimization, the more frequently a frequency is used in the hopping sequence.

15 Claims, 4 Drawing Sheets

LEVELING OUT OF INTERFERENCE IN A MOBILE NETWORK USING A HOPPING METHOD

This application is a continuation of international application serial number PCT/FI98/01030, filed Dec. 30, 1998.

FIELD OF THE INVENTION

The present invention relates to levelling out of interference in a mobile network using the hopping method.

BACKGROUND OF THE INVENTION

In mobile communications systems, mobile stations and base stations are capable of setting up connections using the so-called radio interface channels. Various requirements, depending on the type of data involved, are imposed on such connections relating to the data transmission rate, the accuracy of the data, and transmission delay.

A specific frequency range is always allocated for use by the mobile network. This frequency range is subdivided into channels whose transmission capacity is optimised to match the services provided by the mobile network. To ensure sufficient capacity within the limited frequency range allocated for the mobile network, the channels available must be re-used. For this purpose, the system coverage area is divided into cell consisting of the coverage areas of the individual base stations, which is why such systems are often also referred to as cellular radio systems.

Through the radio connection, mobile stations have access to the services provided by the mobile network. FIG. 1 outlines the structure of a known mobile network system. The network includes a number of inter-connected Mobile Services Switching Centres MSC. A mobile services switching centre MSC is capable of setting up connections with other mobile services switching centres MSC or other telecommunications networks, such as the Integrated Services Digital Network ISDN, the Public Switched Telephone Network PSTN, the Internet, the Packet Data Network PDN, the Asynchronous Transfer Mode ATM and the General Packet Radio Service GPRS. Each mobile services switching centre has several base station controllers BSC connected to it. Similarly, each base station controller is connected to several base stations. The base stations are capable of setting up connections with mobile stations MS. The Network Management System NMS is used for collecting data on the network and re-programming the network elements.

The air interface between the base stations and mobile stations can be divided into channels in a number of different ways. Known methods include at least Time Division Multiplexing TDM, Frequency Division Multiplexing FDM, and Code Division Multiplexing CDM. In TDM systems, the allocated bandwidth is divided into sequential time-slots. A specific number of sequential time-slots constitute a periodically recurring time frame. The channel is defined by the time slot used in the time frame. In FDM systems the channel is defined by the frequency used, and in CDM systems by the frequency-hopping pattern or hashing code. Various combinations of the division methods described above can also be used.

FIG. 2 provides an example of a known FDM/TDM division. In the figure, the vertical axis represents frequency and the horizontal axis time. The allocated frequency range is divided into six frequencies denoted by F1 through F6. In addition, the frequency channel consisting of each individual frequency is sub-divided into recurring time frames made up of 8 sequential time-slots. The channel is always defined by the pair (F, TS), where F is frequency and TS is the time-slot, used in the time frame.

To maximize capacity, the channels must be re-used in cells that are located as close to one another as possible, providing, however, that the quality of the connections using the channels remains adequate. The quality of the connection is affected by the sensitivity of the transmitted information to the transmission errors occurring in the radio channel and the quality of the radio channel. Resilience against signal transmission errors depends on the properties of the information being transferred and can be improved by processing the information by means of channel coding and interleaving before the data are sent and by using re-transmission of erroneous transmission frames.

The quality of the radio channel is, in particular, affected by the extent of mutual interference caused by the connections, which, in turn, depends on the channels used by the connections, the geographical distribution of the connections, and the transmission power used. These factors can be influenced by a systematic allocation of the channels to the various cells with due regard to such interference, by regulating the transmission power, and by averaging the interference experienced by the various connections.

Even if channel allocation is successful, different connections are exposed to different levels of interference. As a result, some connections may suffer from interference that severely affects their quality while other connections could, at the same time, tolerate a higher level of interference. A channel may be allocated, if the signal-to-noise ratio achieved by the connections set up for the channel involved falls below a predefined limit for only a small percentage (e.g. 5 percent), of the connections. If the fluctuations in the level of interference between various connections can be reduced, the said quality of connection can be achieved at a denser re-use rate of the channel, which increases system capacity.

Known methods for levelling out relative interference between connections include frequency hopping, used in the FDM systems, and time-slot hopping, used in the TDM systems. These and other methods based on channel alteration will be collectively referred below as channel hopping methods. In CDM systems, differences in interference between connections can be suppressed by using hashing codes of sufficient diversity. However, in this method, all the connections make use of the same frequency, which increases average cross-interference considerably.

With frequency hopping, the frequency used by the connection keeps changing at short intervals. Thus, the transmission frequency serves as the hopping quantity. The methods can be divided into slow and fast frequency hopping. In fast frequency hopping, the connection frequency is changed more often than the carrier wave frequency. In slow frequency hopping, the connection frequency is changed less often than the carrier wave frequency.

For example, in the known GSM system, frequency hopping is implemented so that an individual burst is always transmitted at one frequency and the burst in the following time-slot at another. As a result, an individual burst can be subjected to a high level of interference. Thanks to channel coding and interleaving, the required quality of connection can be achieved by ensuring that a sufficiently high percentage of the bursts are transmitted free of significant interference. With frequency hopping, this requirement can be satisfied specifically for each individual connection, even if some of the bursts were subjected to major interference.

FIG. 3 provides an illustration of a frequency-hopping arrangement with the frequencies used for the various bursts. Four frequencies, F1 through F4, are allocated for use by the cell. The hopping pattern is cyclic in that the cell transmits the sequential bursts at the frequencies F4, F2, F3, and F1 in that particular order and that this cycle is repeated once completed. Because the length of the cycle is 4 bursts, a single connection in a system using eight time-slot frames shown as an example in FIG. 2 uses the same frequency only for every fourth burst. As a result, the fadings occurring in the connection between the mobile station and the base station are averaged over the individual connections. With frequency hopping, the best levelling-out performance for interference is achieved when the frequency-hopping patterns used by cells close to one another are mutually independent. This is achieved by employing carefully selected cyclic or pseudo-random frequency-hopping patterns.

In time-slot hopping, the hopping quantity is the TDMA frame time-slot used for the connection. FIG. 4 illustrates a time-slot hopping pattern where the signal is transmitted in sequential frames in time-slots 1, 4, 0, and 6, after which the cycle is repeated. To achieve the best possible performance, the hopping patterns used in time-slot hopping must also be mutually independent in cells close to one another.

To maximize the benefits offered by the hopping methods, steps must be taken to optimise the hopping pattern. Dynamic determination of the frequencies used for hopping is the best-known method.

U.S. Pat. No. 5,541,954 (Emi) describes a frequency-hopping method for wideband telecommunications systems where frequency is changed according to a pre-determined hashing code. This method monitors errors in the received data and calculates the number of errors detected at a given hopping frequency. When the number of errors at a given hopping pattern frequency exceeds a pre-determined limit, the frequency is changed to another frequency that is available at that particular moment.

In the method in accordance with the said publication, the set of frequencies in the frequency-hopping pattern is essentially changed as a function of the errors detected. However, the frequencies in the frequency set are used equally.

U.S. Pat. No. 5,394,433 (Bantz et al.) describes a method for controlling and performing frequency-hopping operations. Specifically, the invention introduced in the publication relates to the determination of the frequency-hopping pattern, detection of interference, and changing of the frequency-hopping pattern. Frequency hopping is defined in terms of a set of hopping frequencies and a hopping code controlling the use of the frequencies, of which only the set of hopping frequencies is modified. The frequencies are used equally.

U.S. Pat. No. 5,425,049 (Dent) describes a method for increasing interference diversity by using staggered delays between frequency hops in the neighbouring base stations. The frequency used for the link between the mobile station and the base station changes according to a pseudo-random hopping pattern following uniform usage distribution.

The number of users in the mobile networks and the use of applications requiring wide bandwidths, such as multimedia applications, are growing rapidly. Consequently, the volume of information transmitted in the system increases, causing a higher average level of interference within the system. As a result, more stringent requirements are being imposed on methods to level out interference, and the prior art methods developed for this purpose are no longer capable of providing the required performance.

The aim of the present invention is to resolve the problem described above. This is accomplished by means of the method described in the independent patent claims.

BRIEF SUMMARY OF THE INVENTION

The idea of the invention is to optimize the levelling-out of interference by adjusting the usage distribution of the hopping states. Usage distribution is not necessarily uniform; instead, the various hopping states have varying usage rates in the hopping pattern. In other words, some hopping states are used more frequently than others.

Preferably, the distribution of the hopping states is determined by minimizing a pre-defined penalty function. For example, optimum distribution can be measured based on network geometry, predicted or measured field strengths, and traffic data.

Once the usage distribution of the frequencies is determined, it is possible to determine the frequency-hopping patterns for the connection to be used. The higher the probability that a frequency will be used for a given connection, as defined by the optimization, the more frequently a frequency is used in the hopping sequence.

When used for fixed channel allocation, the invention provides a frequency planning scheme used to allocate frequency distributions and the hopping sequences for their implementation to the transceivers in the cell. In the case of dynamic allocation, the invention provides a method for dynamically changing the distribution of frequencies available for the connections in the cell involved and for defining the hopping sequences.

BRIEF DESCRIPTION OF THE DRAWINGS

The invention is explained in more detailed with reference to the following drawings, where.

DETAILED DESCRIPTION OF THE INVENTION

Figure 1:
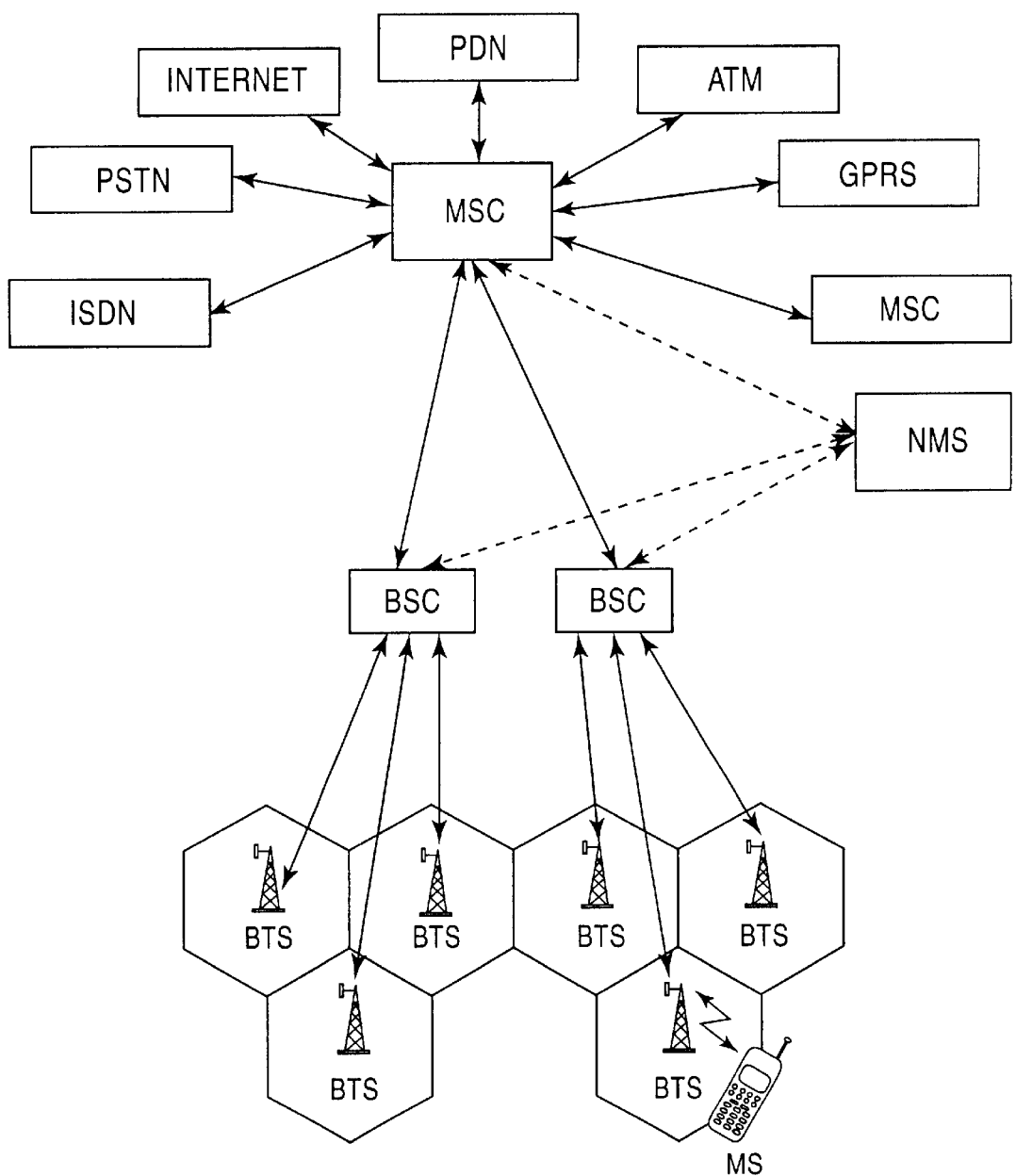
FIG. 1 illustrates sections of a mobile network essential to the invention.
Figure 2:
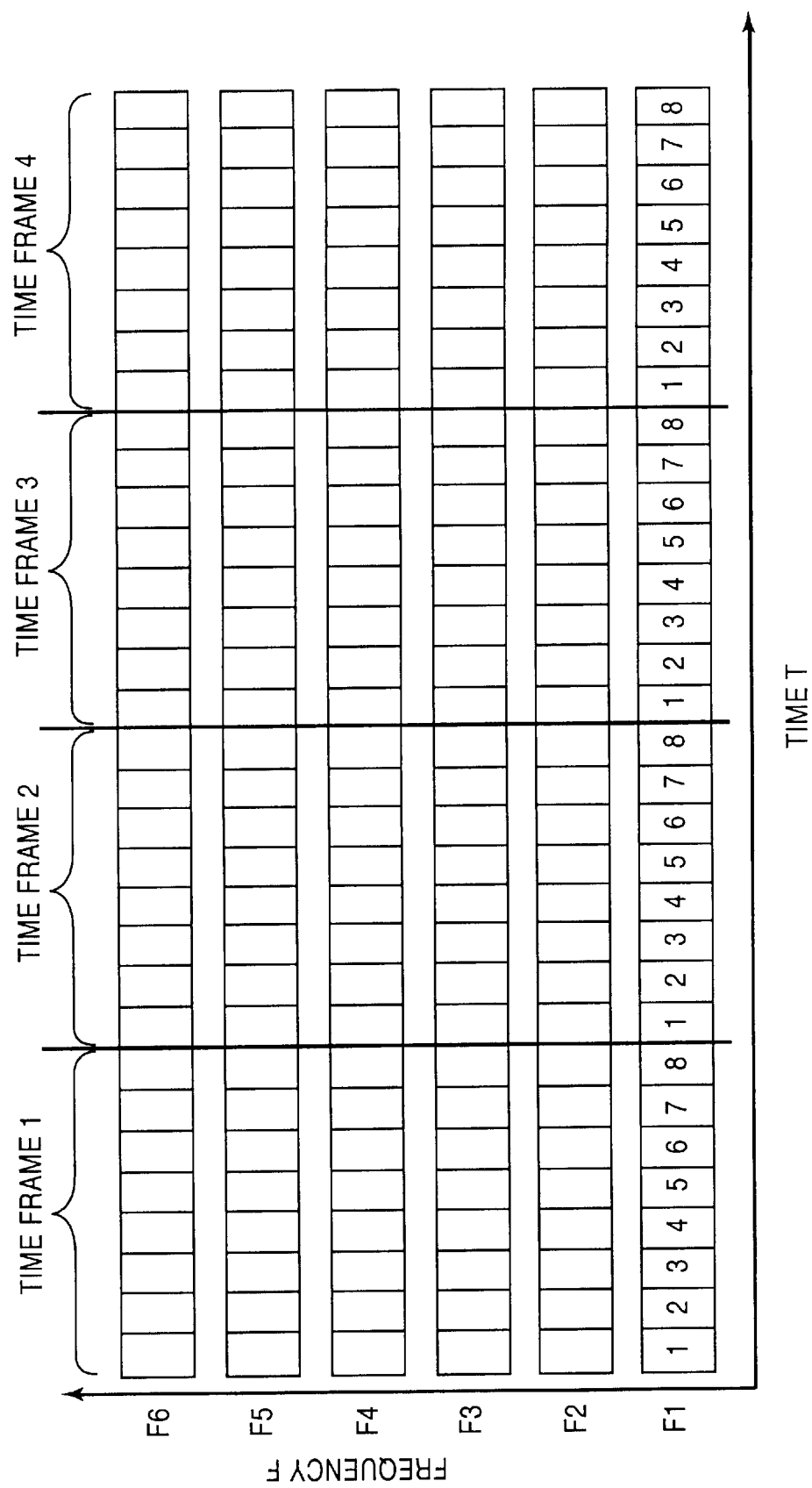
FIG. 2 illustrates the FDM/TDM distribution.
Figure 3:
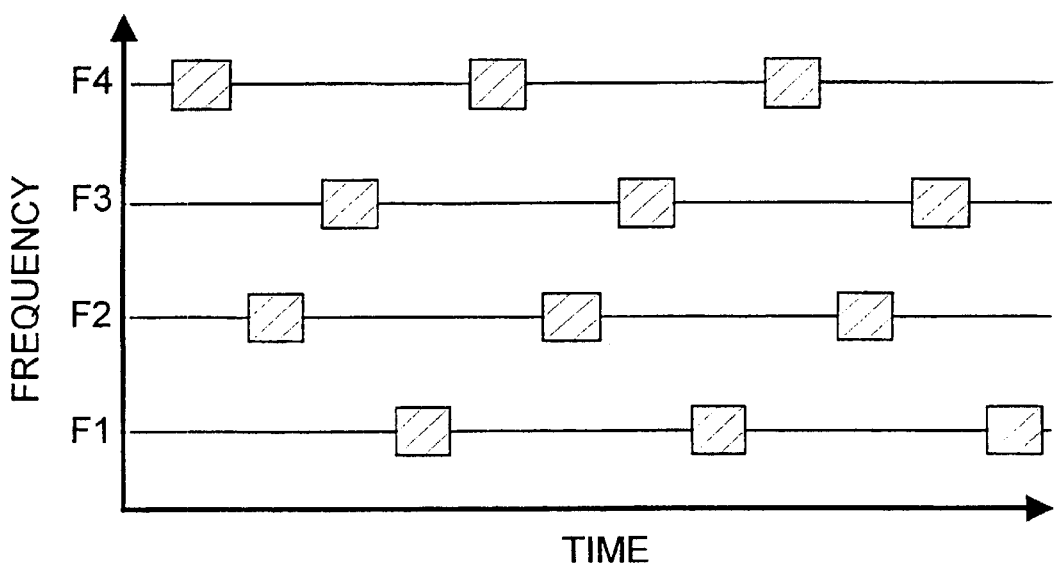
FIG. 3 illustrates, by way of an example, a frequency-hopping pattern for a radio connection as a function of time.
Figure 4:
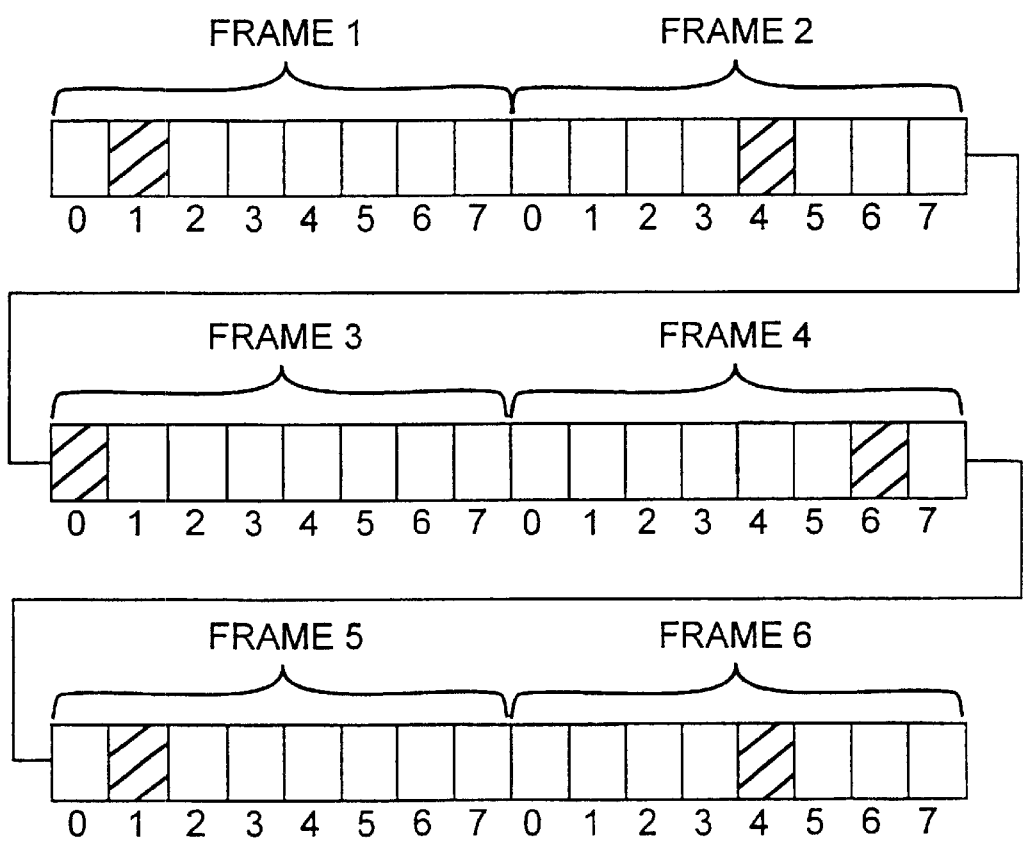
FIG. 4 illustrates, by way of an example, a time-slot hopping pattern for a radio connection in a TDMA system.
Figure 5A:
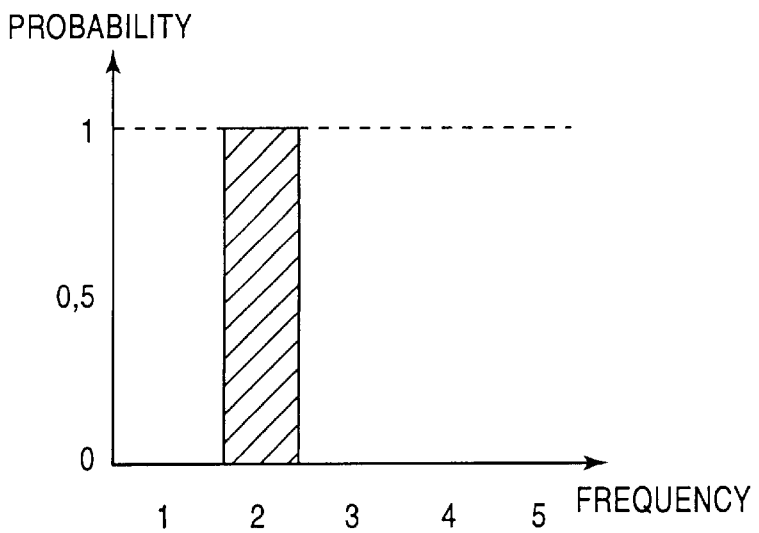
FIGS. 5A, 5B and 5C illustrate distributions of frequency usage.
Figure 5B:
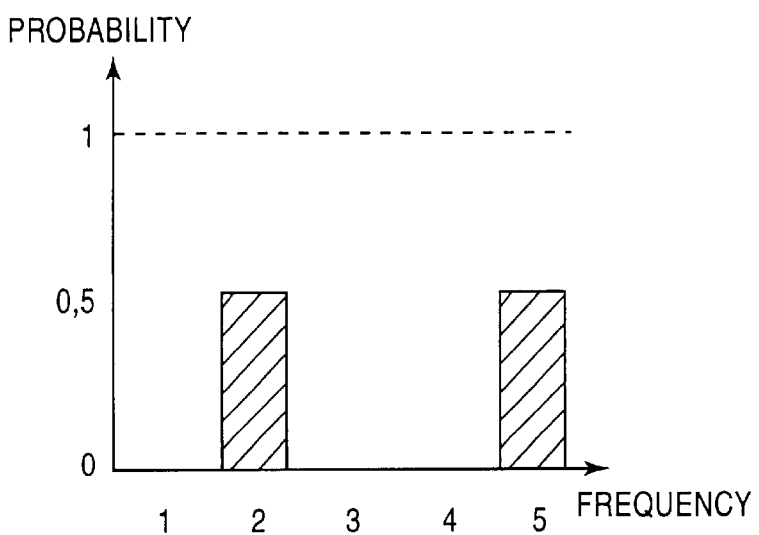
Figure 5C:
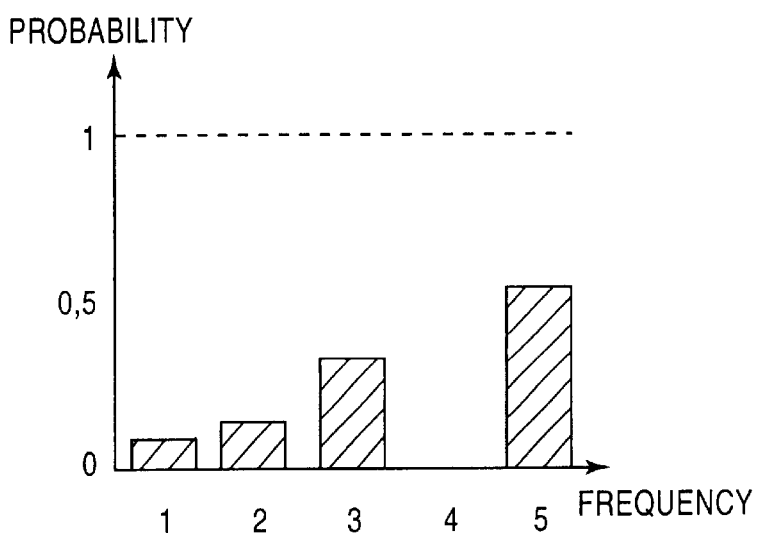

The main element of change to current hopping methods introduced by the invention is outlined in FIGS. 5A, 5B, and 5C. While the figures use a frequency-hopping system as an example, the invention is not limited to this system; instead, any hopping method, such as time-slot hopping, can be substituted for frequency hopping.

FIG. 5A shows a prior art arrangement where frequency hopping is not used. There, the connection uses only frequency 2. FIG. 5B illustrates a prior art arrangement where the connection uses a frequency-hopping sequence consisting of two frequencies, 2 and 5. Both frequencies are used equally, i.e. frequency 2 is used for 50 percent of the time and frequency 5 for the remaining 50 percent. FIG. 5C shows an arrangement in accordance with the present invention, where the hopping frequencies for frequency hopping are used according to a free probability distribution. In the example shown in the figure, frequency 1 is used for 10 percent of the time, frequency 2 for 15 percent, frequency 3 for 25 percent, and frequency 5 for 50 percent of the time. Consequently, the connection can make more efficient use of frequencies with a low level of interference without, however, inducing an excessive increase in the level of interference for these frequencies. Thus, an improved levelling-out of interference for the system as a whole is achieved.

Determining the frequency usage distribution is an optimization task. In the design stage, the optimum distribution can be assessed by means of network geometry, predicted or measured field strengths, and penalty functions based on traffic data. For example, the expectation value E(BER(i)) for the Bit Error Ratio BER for connection i can be used as the penalty function:

$$E(BER(i)) = \sum_{j \neq i} b_{ij} \cdot P(k(i) = k(j)) = \sum_{j \neq i} b_{ij} \cdot \sum_k P(k_i = k) \cdot P(k_j = k), \quad (1)$$

where $b_{ij}$ is the expectation value for bit error ratio caused by connection j to connection i when the two connections use the same channel, and P(k(i)=k(j)) is the probability for connections i and j using the same channel.

For example, optimization can be used for minimizing the highest bit error ratio max(E(BER(i))) of the connections or for maximizing the number of connections attaining bit error ratios below a specific limit maxBER, or, more generally, the probability for the limit maxBER not being exceeded.

One important benefit offered by the arrangement in accordance with the present invention is that the state space for the use of frequencies is continuous. This makes it possible to use optimization methods based on differential calculus, such as the gradient method. This is of benefit, especially, to systems using dynamic channel allocation where channels are allocated to cells dynamically in response to traffic requirements. Then, the system knows at the moment of change in the traffic demand how the frequency distributions for the various connections should be changed, making it possible to effect updating very quickly. At low network loads, fixed frequencies can be allocated to the connections. When the load increases, several frequencies will be placed in service and used on a non-uniform distribution basis.

Once the usage distribution is defined for the frequencies, it is possible to determine the frequency-hopping pattern for the connection. The higher the probability that a frequency will be used for a given connection, as determined by optimization, the more frequently a frequency is used in the hopping sequence. For example, if the frequency usage distribution defined for a connection is

| Fi | P(Fi) |
|---|---|
| F1 | 0.1 |
| F2 | 0.15 |
| F3 | 0.25 |
| F4 | 0 |
| F5 | 0.5 | the frequency-hopping pattern implementing the desired usage distribution is (F1, F1, F2, F2, F2, F3, F3, F3, F3, F3, F5, F5, F5, F5, F5, F5, F5, F5, F5). The signal hops between these 20 elements in the list in a pseudo-random or cyclic sequence. If the distribution is more complex, the frequency-hopping pattern designed to effect the desired usage distribution must be defined approximately. The accuracy of the resulting frequency distribution is determined by the maximum length of the frequency list.

Naturally, the definition can be carried out in various ways, the method described above being just one example.

Let us examine the bit error ratios for two connections in a situation where only frequencies F1 and F2 are in use. When the connections use the same channel, the bit error ratio caused by the connections to each other is b=0.05. For the sake of clarity, interference from neighbouring channels is ignored in this example. Interference from other connections is shown in the following table:

|  | BER(F1) | BER(F2) |
|---|---|---|
| con. 1 | c11 = 0.01 | c12 = 0.075 |
| con. 2 | c21 = 0.015 | c22 = 0.1 |

Assuming that the joint distribution of frequencies is

| con. 2/con. 1 | F1 | F2 |
|---|---|---|
| F1 | f11 | f12 |
| F2 | f21 | f22 | the approximate bit error ratios for the connections are obtained as BER(connection 1)=f11*(b+c11)+f12*c12+f21*c11+f22*(b+c12) and BER(connection 2)=f11*(b+c21)+f12*c21+f21*c22+f22*(b+c22).

Let us first examine a situation where the use of frequencies by the connections is not synchronised, but they are independent of each other. An example of free distribution in accordance with the present invention is as follows

|  | P(F1) | P(F2) |
|---|---|---|
| con. 1 | 0.82 | 0.18 |
| con. 2 | 0.92 | 0.08 |

Because the use of frequencies by the connections is not synchronised, the joint distribution of frequencies is

| con. 2/con. 1 | F1 | F2 |
|---|---|---|
| F1 | 0.7544 | 0.1656 |
| F2 | 0.0656 | 0.0144 |

Similarly, a frequency scheme for uniform distribution is

|  | P(F1) | P(F2) |
|---|---|---|
| con. 1 | 0.5 | 0.5 |
| con. 2 | 0.5 | 0.5 | which gives a joint distribution of

| con. 2/con. 1 | F1 | F2 |
|---|---|---|
| F1 | 0.25 | 0.25 |
| F2 | 0.25 | 0.25 |

With fixed, non-hopping frequency allocation, such as the allocation (F1, F2) (F1 for connection 1 and F2 for connection 2), the frequency distribution is

|        | F1 | F2 |
|--------|----|----|
| con. 1 | 1  | 0  |
| con. 2 | 0  | 1  | and the joint distribution of frequencies is

| con. 2/con. 1 | F1 | F2 |
|---------------|----|----|
| F1            | 0  | 0  |
| F2            | 1  | 0  |

The expectation values for the bit error ratios for connections 1 and 2 at different allocations are shown in the following table:

| BER    | general | uniform | fixed (F1,F1) | (F1,F2) | (F2,F1) | (F2,F2) |
|--------|---------|---------|---------------|---------|---------|---------|
| con. 1 | 0.0601  | 0.0675  | 0.0600        | 0.0750  | 0.01    | 0.1250  |
| con. 2 | 0.0602  | 0.0825  | 0.0650        | 0.0150  | 0.1     | 0.1500  |

The table indicates that, in this example, general distribution yields an improvement of approximately 7 per-cent in the maximum value of the bit error ratio compared to the frequency schemes for non-hopping and uniform distribution.

If the frequencies used simultaneously by different connection can be synchronized, major benefits are obtained. This mades it possible to take administrative steps to prevent two mutually interfering connections from using the same channel.

Generally, the use of a frequency by N connections can be illustrated by the N-dimensioned tensor $f^{i_1,i_2,i_3, \ldots, i_N}$, whose element $f_{k_1,k_2,k_3, \ldots, k_N}^{i_1,i_2,i_3, \ldots, i_N}$ represents the probability for connections $i_1, i_2, i_3, \ldots, i_N$ simultaneously using the frequencies $k_1, k_2, k_3, \ldots, k_N$. For each tensor element, i.e. the frequency state of the connection, there is a specific interference for the connection. If the use of frequencies for various connections can be coordinated, it is possible to block the frequency states in which the connections interfere most with one another.

Let us now examine synchronized frequency hopping where the frequency combination for connections can be controlled. An example of the joint distribution of free synchronised frequency usage in accordance with the present invention is

| con. 2/con. 1 | F1  | F2  |
|---------------|-----|-----|
| F1            | 0   | 0.6 |
| F2            | 0.4 | 0   |

Similarly, the joint distribution of frequencies of a conventional synchronized frequency hopping using uniform distribution is

| con. 2/con. 1 | F1  | F2  |
|---------------|-----|-----|
| F1            | 0   | 0.5 |
| F2            | 0.5 | 0   |

Using synchronized frequency schemes, the equations presented above yield the following expectation values for bit error ratios:

| BER    | general | uniform |
|--------|---------|---------|
| con. 1 | 0.0490  | 0.0425  |
| con. 2 | 0.0490  | 0.0575  |

The table indicates that, in this example, general distribution yields an improvement of approximately 15 percent in the maximum value of the bit error ratio compared to the frequency schemes for non-hopping and uniform distribution.

For the sake of clarity, the examples given in this application involve systems that use only two frequencies. The benefit offered by frequency-hopping methods increases with the increase in the number of frequencies used. Similarly, the increase in the size of the state space provided by an arrangement in accordance with the present invention and available for optimization leads to greater benefits as the number of available frequencies grows.

The invention can be used with various channel allocation methods. Known channel allocation methods are Fixed Channel Allocation FCA, Dynamic Channel Allocation DCA, and Hybrid Channel Allocation HCA based on a combination of FCA and DCA. The idea with fixed channel allocation is to assign the channels available to the system to the individual cells in accordance with the frequency assignment scheme to be prepared before the system is commissioned. In dynamic channel allocation, all the channels are placed in a channel pool from which the best channel, as defined by some pre-determined criterion, is selected for use. In hybrid channel allocation, some of the channels available to the system are assigned to the individual cells on the FCA basis while the rest are placed in a channel pool for subsequent dynamic allocation to any cell. The various methods are described in fairly good detail in the publication "Channel Assignment Schemes for Cellular Mobile Telecommunication Systems: A Comprehensive Survey", IEEE Personal Communications, pp. 10–31, June 1996, by I. Katzela and M. Naghshineh.

For fixed channel allocation, the invention provides a method for frequency scheme preparation, by which frequency distributions and the hopping sequences for their implementation are allocated to transceivers. For dynamic allocation, the invention provides a method for dynamically changing the distribution of frequencies used by the cell and for defining the hopping sequences.

The present invention allows more efficient use of the frequency bandwidth. In addition, with dynamic allocation, the frequency-hopping pattern may depend on the traffic load, which makes it possible to optimise the use of the bandwidth for the traffic at any particular moment. As extremes, the method covers uniform usage of all the frequencies in the hopping pattern as well as a situation where hopping is not used. Thus, no algorithm to decide whether hopping is used or not is required.

In the foregoing, the invention has been explained with regard to a system using frequency hopping. However, the invention is not limited to this but can be used together with other hopping methods such as time-slot hopping.

What is claimed is:

1. A method for levelling out interference in a mobile network that comprises at least mobile stations and base stations, that enables the establishment of a radio connection between a mobile station and a base station and that uses a hopping method for levelling out interference, determining hopping states belonging to the hopping pattern of a connection, determining usage probabilities of varying values for the hopping states by optimizing the usage distribution of the hopping states, and determining a hopping pattern essentially implementing the usage probability distribution.

2. The method in accordance with claim 1, wherein density functions for the probability of usage of the hopping states are defined by means of optimization.

3. The method in accordance with claim 2, wherein the density functions are defined by minimizing a function being composed of error probabilities for the connections in the system.

4. The method in accordance with claim 2, wherein information on the network geometry, field strength and traffic volume is used in the optimization.

5. The method in accordance with claim 4, wherein the information on field strength consists of a theoretical prediction of field strength.

6. The method in accordance with claim 4, wherein the information on field strength consists of the result of a measurement on field strength.

7. The method in accordance with claim 4, wherein the information on traffic volume consists of a predicted traffic volume.

8. The method in accordance with claim 4, wherein the information on traffic volume is the result of a measurement of traffic volume.

9. The method in accordance with claim 1, wherein the usage probability distributions of the hopping states are fixedly allocated to the base station transceivers specifically for each individual transceiver.

10. The method in accordance with claim 1, wherein the usage probability distributions of the hopping states are allocated to the transceivers of the base station dynamically in response to traffic load.

11. The method in accordance with claim 1, wherein a number of certain hopping states in the hopping pattern is higher than that of other hopping states.

12. The method in accordance with claim 11, wherein the hopping pattern is a pseudo-random sequence.

13. The method in accordance with claim 11, wherein the hopping pattern is a cyclic sequence.

14. The method in accordance with claim 11, wherein hopping patterns for connections are synchronized so that the connections interfere with one another as little as possible.

15. The method in accordance with claim 14, wherein the hopping patterns are synchronized so that the connections do not simultaneously use channels that cause significant mutual interference when used by the connections.

* * * * *